Patented July 22, 1941

2,249,922

UNITED STATES PATENT OFFICE 2,249,922

HALOGENATION OF SATURATED HYDROCARBONS

William E. Vaughan and Frederick F. Rust, Berkeley, Calif., assignors to Shell Development Company, San Francisco, Calif., a corporation of Delaware No Drawing. Application August 22, 1939, Serial No. 291,366

12 Claims. (Cl. 260—662)

This invention relates to a process for effecting the halogenation of saturated hydrocarbons, and more particularly pertains to an improved, practical and economical process for halogenating, via substitution, a saturated organic compound of the class of saturated aliphatic and cycloaliphatic hydrocarbons, as well as their partially halogenated derivatives having more than two carbon atoms per molecule.

It is known that saturated aliphatic and/or cycloaliphatic hydrocarbons, as well as their products of partial halogenation, may be halogenated or further halogenated, by reacting them with a halogen at an elevated temperature which induces a "substitution" reaction in which a halogen atom is substituted for a hydrogen atom attached to a carbon atom of the hydrocarbon molecule. It is also known that such halo-substitution reactions between a halogen and a saturated hydrocarbon of the class described may be effected efficiently by subjecting the mixture to elevated temperatures which favor the halo-substitution reaction, these temperatures, however, being below those at which substantial degradation and/or decomposition of the reactants and/or products of reaction occurs.

Generally, the halo-substitution reaction between saturated hydrocarbons and the halogen is effected by commingling the reactants and heating them to the desired reaction temperature. As an alternative, the hydrocarbon or the partially halogenated derivative thereof is heated and then commingled with a heated or unheated halogen, thereby effecting the desired reaction. Since the reaction is exothermic in character, it is unnecessary to preheat the reactant or reactants to the optimum reaction temperature. Obviously, the desired or necessary temperatures for effecting such substitution reactions will vary with the nature of the hydrocarbon reactant, the character of halogen used, as well as with the operating conditions, such as type of reactor, use of diluent, etc. However, it may be stated generally that temperatures above about 150° C. must be used in order to initiate halo-substitution in the absence of light. In general, the optimum temperature lies between about 225° C. and 700° C., the upper limit being controlled by the degradation of the reactants and/or products of reaction obtained. Thus, if the temperature is too high, it becomes increasingly difficult to avoid a considerable pyrolysis of the halogenated products and even of the hydrocarbon being halogenated. This pyrolysis may, of course, be greatly reduced by allowing the hydrocarbon and particularly the halogenated products to remain in the heated reaction zone for only a very short time. Since the rate of halogenation increases relatively rapidly with the elevation of the reaction temperature, and at all temperatures within the specified range is much more rapid than the pyrolysis, there is no definite upper limit to the temperatures which might be employed. Thus, if it were possible to heat the reactants and cool reaction products with sufficient rapidity, it would be possible to halogenate even at or above the aforementioned upper temperature limit, without any substantial decomposition. However, since it becomes extremely difficult to suppress such degradation at the higher temperatures, the optimum reaction temperature, which, as stated, varies with the feed stock, etc., is usually the highest temperature at which halogenation proceeds substantially without degradation of reactants and/or products of halo-substitution obtained.

It is also known that the character of the reaction products will depend, at least in part, on the halogen concentration in the reaction mixture. Thus, when an excess of the halogen is employed, there is a great tendency to form polyhalogenated saturated hydrocarbons. Also, such use of halogen in proportions greater than equimolecular, renders the temperature control quite difficult. Therefore, particularly when it is desired to produce monohalides or primary halogenation products, it is the general practice to employ an excess of the saturated compound to be halogenated, the mol ratios of these saturated compounds to the halogen ranging from about 2:1 to 7:1 and even higher. Such low concentration of the halogen in the mixture to be treated is objectionable, since, although the yield of products of halogenation, based on the halogen consumed, may be high, the concentration of such halogenated products in the unreacted hydrocarbons is so low that the separation of such halogenated products is uneconomical.

In order to avoid this, it has been previously proposed to introduce the halogen at a high velocity and at a plurality of separated points along the reaction tube, while the material to be thus halogenated is conveyed therethrough at the desired reaction temperature. By such injection of the halogen at a number of points along the reaction tube, it is possible to maintain a low concentration of the unreacted halogen at any given point in the reaction zone. However, such a system has its defects. Thus, it is necessary to provide a number of mixers for the intimate commingling of the injected halogen streams with the material to be treated.

In the case of the chlorination of ethane, polychlorides are formed as a result of a reaction between the newly formed, energy-rich ethyl chloride molecules and the chlorine in accordance with the following or some similar reaction chain mechanism.

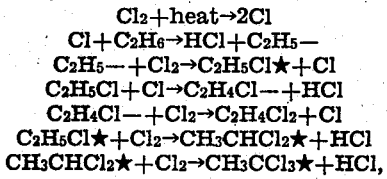

$$Cl_2 + heat \rightarrow 2Cl$$
$$Cl + C_2H_6 \rightarrow HCl + C_2H_5-$$
$$C_2H_5- + Cl_2 \rightarrow C_2H_5Cl\star + Cl$$
$$C_2H_5Cl + Cl \rightarrow C_2H_4Cl- + HCl$$
$$C_2H_4Cl- + Cl_2 \rightarrow C_2H_4Cl_2 + Cl$$
$$C_2H_5Cl\star + Cl_2 \rightarrow CH_3CHCl_2\star + HCl$$
$$CH_3CHCl_2\star + Cl_2 \rightarrow CH_3CCl_3\star + HCl,$$

etc., wherein the dash (—) sign denotes a free radical, while the star (★) indicates an excited, energy-rich molecule. In ordinary practice, when it is desired to halogenate saturated hydrocarbons to produce their monohalides, or to form dihalides from monohalides, frequently it is impossible to control the halogenation process and to limit it to the substantial production of the desired halide or halides, while inhibiting the formation of compounds having a greater number of halogen atoms per molecule. Thus, it is to be noted that the last two equations of the above reaction mechanism are of the type wherein the newly-formed, excited or energy-rich molecules react bi-molecularly with the molecular halogen. It is these and similar reactions which are largely responsible for the formation of the undesirable polyhalides, and, as will be seen, the invention is directed specifically to the inhibition of these bi-molecular reactions.

It is, therefore, the main object of the present invention to avoid the above and other defects, and to provide an efficient process for halogenation of saturated aliphatic and/or cycloaliphatic hydrocarbons, and/or of their partially halogenated derivatives having more than two carbon atoms per molecule. Another object is to provide a process wherein the mol ratio between the hydrocarbon to be treated and the halogen may be relatively low, while avoiding the formation of undesirable polyhalides.

It has now been discovered that the above and other objects may be attained by diluting the reaction mixture with ethyl halide which has become de-activated. This is due to the fact that the reactivity of ethyl halide, when subjected to the action of a halogen at the above-described elevated temperatures, is considerably lower than the reactivity of the saturated, aliphatic and/or cycloaliphatic hydrocarbons, or of their partially halogenated derivatives which contain at least three carbon atoms per molecule, and that the above class of hydrocarbons, when commingled with ethyl halide and subjected to high temperature halogenation, react with such halogen to the substantial exclusion of the ethyl halide. In fact, the reactivity of saturated hydrocarbons and of their partially halogenated derivatives (except ethyl halide), when subjected to high temperature halogenation, is substantially the same. Therefore, if, as an example, propane and n-propyl chloride were commingled and subjected to the action of chlorine at an elevated temperature of about 250°–350° C., both the propane and the n-propyl chloride would be chlorinated, so that the resulting product would consist of a mixture containing unreacted propane, n-propyl chloride, dihalides, and even trihalides. On the other hand, the reactivity of the ethyl halide at any given temperature is considerably lower than that of the above-mentioned class of saturated hydrocarbons and of their halogenated derivatives. It is to be noted, however, that the above-mentioned relatively low reactivity of ethyl halides refers to de-activated molecules, and does not apply to newly formed ethyl halide molecules which are still energy-rich or in an excited state, and the reactivity of which, when subjected to high temperature halogenation, in relatively high and substantially that of the above group of hydrocarbons.

The invention may, therefore, be broadly stated to reside in effecting the thermal halogenation of saturated aliphatic and cycloaliphatic hydrocarbons (as well as of their partially halogenated derivatives having more than two carbon atoms per molecule) in the presence of de-activated or inert ethyl halide which acts as a diluent so that the hydrocarbon-halogen mol ratio may be comparatively low without the danger of forming undesirable polyhalides.

As representative compounds which may be halogenated according to the present invention reference may be made to alkyl hydrocarbons, as ethane, propane, butanes, pentanes and their higher homologues, alicyclic or polymethylene hydrocarbons, such as cyclopropane, methyl cyclopropane, cyclobutane, cyclopentane, etc., as well as the partially halogenated derivatives of the alkyl and alicyclic hydrocarbons having at least three carbon atoms per molecule, as n-propyl chloride, secondary butyl chloride, etc.

The invention may be executed in a batch, intermittent or continuous manner. The first two methods of operation are particularly suitable for the halogenation, via substitution, of saturated hydrocarbons having three or more carbon atoms, as well as of their partially halogenated derivatives. Thus, if it is desired to effect the high temperature halogenation of propane or n-butane according to the present invention, this hydrocarbon is commingled with an ethyl halide, such as ethyl chloride or bromide, and with the halogen. The ratio of the ethyl halide to the hydrocarbon to be treated may vary within wide limits, it being noted that equimolecular amounts of the hydrocarbon and ethyl halide, when subjected to halogenation at temperatures above about 225° C. produced products of halo-substitution of the treated hydrocarbon to the substantial exclusion of products of further halogenation of the ethyl halide. As to the halogen, it is seen that it is possible to employ relatively low molal ratios of the hydrocarbon to be halogenated to the halogen. This is because the relatively inert ethyl halide decreases the halogen concentration and thus produces a m'*'ture in which the molal ratio of the hydrocarbons (including ethyl halide) to the halogen is relatively high. The reaction mixture obtained may then be fractionated or otherwise treated to effect the separation of the ethyl halide from the other alkyl halides. The ethyl halides may then be commingled with new quantities of hydrocarbons to be treated, and the mixture then subjected to high temperature halogenation to effect the formation of further quantities of alkyl halides.

In one of its specific embodiments, however, the invention is particularly applicable to the halogenation of ethane. This is due to the fact that the reaction product, i. e., ethyl halide, after de-activation may be used as the diluent so that the process may be effected in a continuous manner. In such a process, according to the invention, all or a part of the mixture of ethane and of ethyl halide formed during the passage of the ethane-halogen-ethyl halide mixture through the reaction zone, is allowed sufficient time to cause the de-activation of the excited newly-formed ethyl halide molecules, and is then reintroduced or recycled back into the reaction zone after commingling with additional quantities of the halogen and ethane. Obviously, in order to render such a process continuous, a portion of the reaction products may be continuously or intermittently withdrawn for the separation of the ethyl halide therefrom. It is seen that the recycling of the de-activated ethyl halide maintains a low halogen concentration in the gas mixture, and, at the same time, allows a high product, (i. e., ethyl halide) concentration in the mixture withdrawn from the system.

Since at the beginning of a continuous halogenation, the ethane to be halogenated may not contain any ethyl halide, it is preferable to initiate the halogenation operations by commingling the ethane with the halogen in the above-mentioned high molal ratios, thereby avoiding formation of polyhalides. The reaction mixture may then be allowed sufficient time to de-activate the energy-rich excited ethyl halide molecules, and a portion of such mixture may then be repeatedly recycled through the reaction zone after commingling with fresh quantities of ethane and halogen. As the ethyl halide concentration of such recycled stock increases, it is possible to increase the relative ratio of chlorine to total reactants recycled. The de-activation may be realized concurrently with the cooling of the recycled stock prior to its commingling with the ethane and halogen. Instead of providing specific cooling means to dissipate the heat of reaction, it is also possible to commingle such ethyl halide with untreated ethane, thus preheating the same. The period of time necessary for such recycling and commingling is usually sufficient to cause the desired deactivation of the ethyl halide diluent.

The invention is illustrated by the following examples which are presented herein for the purpose of showing the advantages derived from operation according to the process of the present invention and the results obtainable thereby, and are not to be considered as limitative in any sense.

*Example I*

A mixture consisting of equal volumes of ethane and chlorine was diluted with twice its volume of nitrogen, and the resulting diluted mixture conveyed at a rate of about 300 c. c. per minute through a glass reaction zone. The chlorination reaction was effected at different temperatures between about 220° and 320° C., and the following reaction rates, based on the per cent chlorine reacted, were obtained.

| Temperature | Percent $Cl_2$ reacted |
|---|---|
| 222° C | 3.8 |
| 234° C | 11.6 |
| 246° C | 28.0 |
| 259° C | 56.0 |
| 272° C | 69.2 |
| 284° C | 77.0 |
| 289° C | 80.4 |
| 295° C | 83.7 |
| 300° C | 85.0 |
| 312° C | 88.8 |
| 324° C | 93.7 |

In another series of experiments, the mixture subjected to the chlorination (via substitution) contained ethane, ethyl chloride, chlorine and nitrogen. In order to make the two series comparable, the mixture consisted of equal volumes of ethane, ethyl chloride and chlorine diluted with an amount of nitrogen equal to the combined volume of the first three ingredients. As in the first series of experiments, this diluted mixture was conveyed through the reaction zone at a rate of about 300 c. c./ min. The following results based on the per cent chlorine reacted, were obtained when the reactions were effected at the indicated temperatures:

| Temperature | Percent $Cl_2$ reacted |
|---|---|
| 258° C | 50.0 |
| 270° C | 67.3 |
| 276° C | 71.1 |
| 282° C | 75.6 |
| 287° C | 78.1 |
| 295° C | 82.5 |
| 306° C | 90.3 |
| 315° C | 93.1 |
| 318° C | 93.7 |

A comparison of the data obtained in the two series of experiments clearly shows that the per cent chlorine reacting with the hydrocarbon at the various operating temperatures in unaffected by the presence of ethyl chloride. In fact, the quantity of chlorine reacting was substantially the same (within experimental error) whether ethyl chloride was present or absent in the reaction mixture. Therefore, it is obvious that only the ethane was chlorinated in the ethane-ethyl chloride mixture.

*Example II*

A mixture consisting of equal volumes of chlorine, ethane and ethyl bromide was further diluted with nitrogen and then conveyed at a rate of about 300 c. c./min. through a reaction zone wherein the mixture was heated to about 278° C. The effluent gases were analyzed, and it was found that whereas about 0.354 mols of ethyl chloride was obtained, there was less than 0.04 mols of chlorbromoethane.

The results show that the high temperature halogenation of an alkane-ethyl halide mixture produces the halo-substitution of the alkane to the substantial exclusion of the further halogenation of the ethyl halide, such as ethyl chloride or ethyl bromide.

*Example III*

A mixture of ethane, chlorine and a diluent consisting of nitrogen was chlorinated at different temperatures. The rate of flow of the ingredients was: 50 c. c./min. of chlorine, 100 c. c./min. of ethane, and 150 c. c./min. of nitrogen. The following results were obtained:

| Temperature | Percent $Cl_2$ reacted |
|---|---|
| 240° C | 19 |
| 250° C | 46 |
| 257° C | 59 |
| 263° C | 70 |
| 270° C | 78 |

A similar series of chlorination experiments were conducted in which ethyl chloride was substituted for the ethane. The ratios of the ingredients were, however, maintained the same as in the above experiments. The results are tabulated hereinbelow:

| Temperature | Percent Cl₂ reacted |
|---|---|
| 250° C | 14 |
| 260° C | 18 |
| 280° C | 26 |
| 290° C | 34 |
| 316° C | 47 |

A comparison clearly shows that there is a great difference in the reactivity of ethane and ethyl chloride when subjected to thermal chlorination.

*Example IV*

Propane and n-propyl chloride were separately subjected to high temperature chlorinations at various temperatures, the other conditions of operation being maintained constant for purposes of comparison. The following results were obtained:

| Gas | Temperature °C. | Cl₂ reacted Percent |
|---|---|---|
| Propane | 244 | 15.1 |
| n-Propyl chloride | 244 | 13.0 |
| Propane | 258 | 38.0 |
| n-Propyl chloride | 259 | 49.2 |
| Propane | 272 | 96.2 |
| n-Propyl chloride | 272 | 74.3 |
| n-Propyl chloride | 340 | 92.8 |

The above data show that there is substantially little difference in the reactivities of propane and n-propyl chloride, particularly at the lower temperatures. At any rate, the reactivity of the propyl chloride is so high that it would be chlorinated together with propane if a mixture of these two substances were to be subjected to high temperature chlorination. Therefore, n-propyl chloride could not be used as a diluent according to the present invention. Experimental data also indicate that the reactivity of other halides (above ethyl halide) are so close to that of the corresponding saturated aliphatic hydrocarbons, that these halides cannot be used as diluents according to the present invention.

Although the invention has been described with particular reference to the chlorination of ethane in the presence of a diluent consisting of an ethyl halide, such as ethyl chloride or bromide, it is to be understood that other saturated organic compounds, and particularly the higher homologues of ethane, and their products of partial halogenation, may be halogenated according to the present process by employing the ethyl halide as the diluent. In all such cases the presence of the ethyl halide increases the mol ratio between the hydrocarbon-ethyl halide mixture and the halogen while at the same time permitting relatively low mol ratios between the hydrocarbon to be halogenated and the halogen employed therefor. Thus, by using equimolecular amounts of ethane and ethyl chloride, the overall mol ratio between the hydrocarbon-ethyl chloride mixture and the halogen may be, for example, 2:1, whereas the actual mol ratio of ethane (which is to be halogenated) to halogen, in fact, is 1:1. In other words, the use of the ethyl halide allows the maintenance of the desired overall mol ratios of 2:1 to 7:1, or even higher, while maintaining a relatively low mol ratio between the hydrocarbon to be treated and the halogen.

The products formed through the use of the present process, particularly the halides of saturated aliphatic hydrocarbons, find numerous uses both as intermediates and as final products. Thus, ethyl chloride and ethyl bromide are employed for the preparation of tetraethyl lead, a known motor fuel knocking depressant. Ethyl chloride is also the primary material for making ethyl cellulose, as well as of ethyl mercaptan which in itself is an intermediate in the preparation of sulfonal, a known soporific. Furthermore, ethyl chloride is used as a refrigerant and as a local freezing anesthetic for minor preparation. The other saturated aliphatic halides are also highly useful and valuable products.

The term "ethyl halide" as employed herein and in the appended claims refers to the monohalide of ethane. As to the term "partially halogenated derivatives of saturated aliphatic hydrocarbons," or equivalent terms, these refer to saturated aliphatic hydrocarbons, above ethane, one or more hydrogen atoms of which have been replaced by a halogen atom. Obviously, these partially halogenated hydrocarbons must be susceptible to further halogenation, i. e. have replaceable hydrogen atoms.

We claim as our invention:

1. In a continuous process for producing ethyl chloride, the steps of continuously commingling free chlorine with ethane and de-activated ethyl chloride, conveying said mixture through a reaction zone wherein the reactants are at a temperature of above about 225° C. but below the temperature at which substantial degradation of the carbon structure is favored, thereby chlorinating the ethane to the substantial exclusion of ethyl chloride, continuously withdrawing the reaction mixture from the reaction zone, continuously de-activating the energy-rich ethyl chloride of at least a portion of said mixture, and recycling said portion containing the de-activated ethyl chloride for commingling with and dilution of additional quantities of ethane and chlorine to be reacted.

2. The process of claim 1, wherein the de-activation of the ethyl chloride in the recirculated portion of the reaction mixture is effected while cooling the recycled portion prior to commingling with additional quantities of reactants.

3. In a continuous process for the halogenation of ethane, the steps of continuously commingling de-activated ethyl halide selected from the group consisting of ethyl chloride and ethyl bromide with ethane and a halogen selected from the group consisting of chlorine and bromine, conveying said mixture through a reaction zone at an elevated temperature above about 225° C. but below the temperature at which substantial decomposition is favored, thereby halogenating the ethane to the substantial exclusion of ethyl halide, continuously withdrawing the obtained mixture from the reaction zone, separating a portion of said mixture, de-activating the energy-rich excited ethyl halide in said separated portion of the mixture, and recycling said portion containing the de-activated ethyl halide for commingling with and dilution of additional quantities of ethane and the halogen to be reacted.

4. A process for halogenating ethane to obtain high yields of ethyl halide to the substantial exclusion of polyhalides, which comprises commingling ethane, a halogen selected from the group consisting of chlorine and bromine, and a de-activated ethyl halide selected from the group consisting of ethyl chloride and ethyl bromide, and subjecting said mixture to an elevated temperature of above 150° C. but below the temperature at which substantial degradation is favored, thereby effecting the halogenation of the ethane to the substantial exclusion of the formation of polyhalides, and separately removing the obtained ethyl halide.

5. A process of claim 4, wherein the halogenation is effected at a temperature of between about 225° C. and 700° C.

6. The process which comprises bringing together gaseous ethane and a halogen selected from the group consisting of chlorine and bromine at an elevated temperature of above about 150° C. but below the temperature at which substantial degradation occurs in the presence of a de-activated product formed by their combination.

7. The process which comprises bringing together ethane and a chlorine in the presence of a de-activated product formed by their combination, and effecting a reaction at a temperature of above about 150° C. but below the temperature at which substantial degradation occurs.

8. A process for effecting the halogenation of saturated aliphatic hydrocarbons, which comprises commingling said hydrocarbon with a halogen selected from the group consisting of chlorine and bromine and with de-activated ethyl halide selected from the group consisting of ethyl chloride and ethyl bromide, and effecting the reaction at an elevated temperature at which the aliphatic hydrocarbon is halogenated to the substantial exclusion of halogenation of the ethyl halide which acts as a diluent to decrease the concentration of the halogen and thereby inhibit the formation of polyhalides.

9. A process of claim 8, wherein the mol ratio between the aliphatic hydrocarbon subjected to treatment and the halogen is substantially one, but wherein the addition of the ethyl halide decreases the overall halogen concentration, thereby inhibiting formation of polyhalides.

10. In a process of obtaining saturated halogenated organic compounds, the steps of commingling a saturated organic compound selected from the group consisting of saturated aliphatic and cycloaliphatic hydrocarbons and of their partially chlorinated and brominated derivatives which contain at least three carbon atoms per molecule, with a halogen selected from the group consisting of chlorine and bromine and ethyl halide selected from the group consisting of ethyl chloride and ethyl bromide, and effecting the reaction between said halogen and the organic compound at an elevated temperature above 150° C. but below the temperature at which degradation of the organic reactants and products occurs, the added ethyl halide acting as a diluent to decrease the halogen concentration.

11. In a process of halogenating saturated organic compounds, the steps of commingling an organic compound selected from the group consisting of saturated aliphatic and cycloaliphatic hydrocarbons and of their partially chlorinated and brominated derivatives which contain at least three carbon atoms per molecule, with a halogen selected from the group consisting of chlorine and bromine, and effecting the reaction at an elevated temperature and in the presence of deactivated ethyl halide selected from the group consisting of ethyl chloride and ethyl bromide, thereby halogenating the saturated organic compounds other than the ethyl halide.

12. The process of claim 11, wherein the halogenation reaction is effected at a temperature of above 150° C.

WILLIAM E. VAUGHAN.
FREDERICK F. RUST.